United States Patent [19]

Wheatley et al.

[11] 4,033,550

[45] July 5, 1977

[54] WATER GATE VALVE

[75] Inventors: Charles Wheatley; Ronald A. Schuller; Al Hogan, all of Tulsa, Okla.

[73] Assignee: Wheatley Company, Tulsa, Okla.

[22] Filed: Aug. 19, 1975

[21] Appl. No.: 605,855

Related U.S. Application Data

[63] Continuation-in-part of Ser. No. 440,670, Feb. 8, 1974, abandoned, which is a continuation of Ser. No. 279,214, Aug. 9, 1972, abandoned.

[52] U.S. Cl. .............................. 251/328; 251/329; 251/363
[51] Int. Cl.² ......................................... F16K 3/02
[58] Field of Search ........... 251/327, 328, 329, 363

[56] References Cited

UNITED STATES PATENTS

| 2,100,996 | 11/1937 | Moore | 251/327 X |
| 3,013,769 | 12/1961 | Volpin | 251/328 X |
| 3,164,163 | 1/1965 | Oliver | 251/327 X |
| 3,164,363 | 1/1965 | Williams | 251/328 |
| 3,269,694 | 8/1966 | Hardison | 251/328 X |
| 3,353,784 | 11/1967 | Grove | 251/328 X |
| 3,614,061 | 10/1971 | Fitzpatrick | 251/327 |
| 3,710,816 | 10/1970 | Prince | 251/327 X |

FOREIGN PATENTS OR APPLICATIONS 1,214,959   4/1966   Germany .......................... 251/328

*Primary Examiner*—Arnold Rosenthal

[57] ABSTRACT

A gate valve having a valve body particularly designed and constructed of a "slim" design, or of a minimum overall length whereby the valve may be interposed in a flow line in a minimum of space.

3 Claims, 7 Drawing Figures

WATER GATE VALVE

This is a continuation-in-part of U.S. Pat. application Ser. No. 440,670 filed Feb. 8, 1974, now abandoned, which is a continuation of U.S. Pat. application Ser. No. 279,214 filed Aug. 9, 1972, and now abandoned.

BACKGROUND OF THE INVENTION

1. Field of the Invention

This invention relates to improvements in valves and more particularly, but not by way of limitation, to a gate valve having a body which is of a slim design.

2. Description of the Prior Art

Gate valves are frequently enterposed in flow lines or distribution pipelines wherein oil, gas, or any suitable fluid is transported therethrough for delivery to a consumer. Normally the distribution line is utilized for delivery of the fluid to a plurality of consumers and the gate valves are interposed in the line at predetermined positions for stopping the flow or diverting the flow of the products when the custody of the product is changed. Also, there are many instances wherein gate valves are utilized in flow lines wherein corrosive materials are being handled, and other instances wherein there are great erosion problems encountered. In addition, it is frequently desirable to interpose a gate valve in a relatively limited or small longitudinal space in the flow line.

SUMMARY OF THE INVENTION

The present invention contemplates a novel gate valve particularly designed and constructed for overcoming the above problems and disadvantages. The gate member and valve seating portions may be constructed from a ceramic material having extremely high compressive strength and hardness for installations wherein corrosion and or erosion are encountered. In addition, the valve body is particularly designed and constructed of a minimum length in order to provide a reduced overall length for the valve, thus facilitating the installation of the valve in a minimum space in a flow line. The novel valve is simple and efficient in operation and economical and durable in construction.

Figure 4:
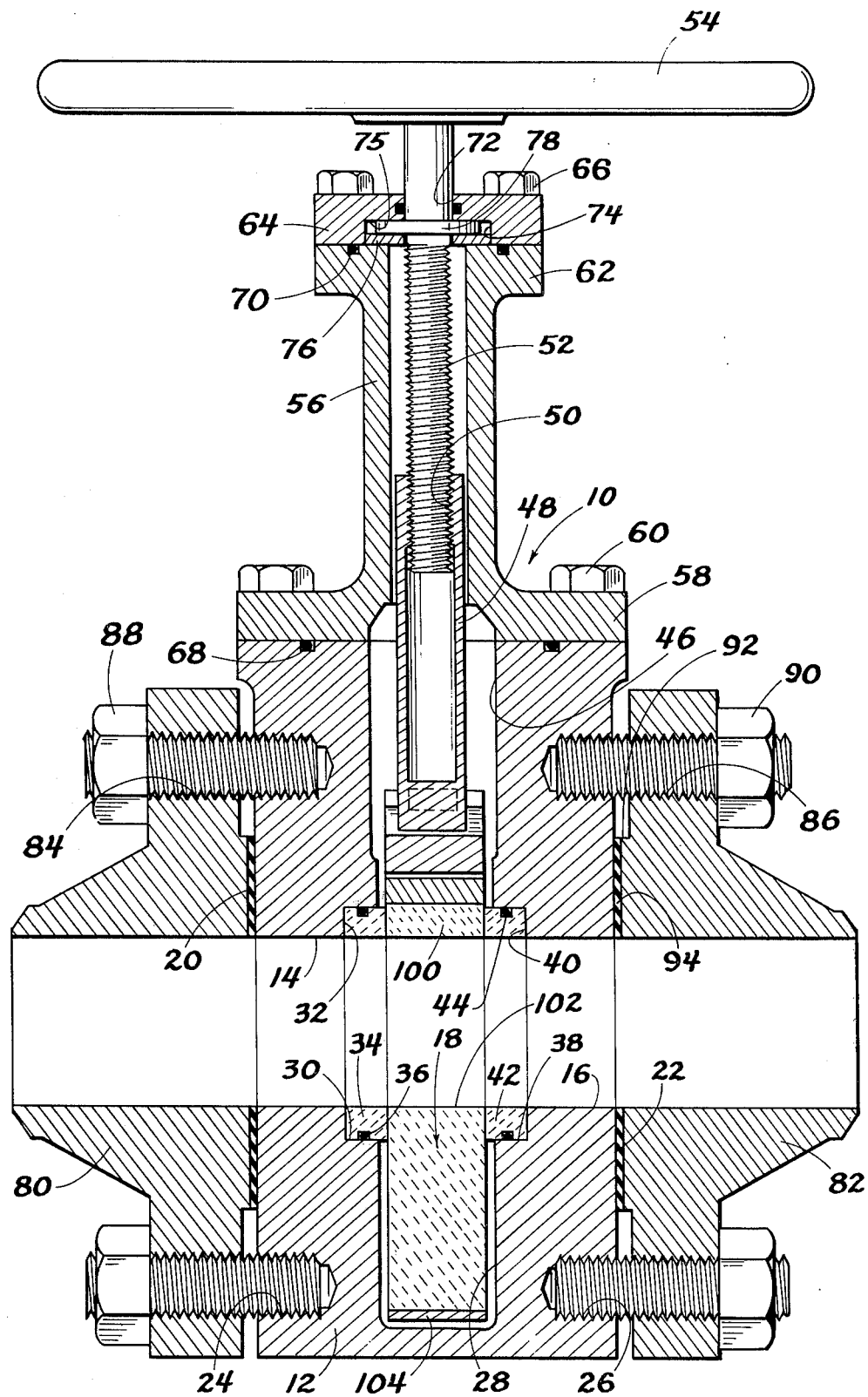
FIG. 4 is an enlarged sectional elevational view of a wafer gate valve embodying the invention.

Referring to the drawings in detail, and particularly FIG. 4, reference character 10 generally indicates a wafer gate valve comprising a valve body 12 having aligned bores 14 and 16 for providing a fluid passageway through the body 12. Normally, the flow of fluid through the bores 14 and 16 is unidirectional, and a gate member, generally indicated at 18 is interposed therebetween in a manner as will be hereinafter set forth for alternately opening and closing communication between the bores 14 and 16 to provide open and closed positions for the valve 10.

The opposite sides 20 and 22 of the body 18 are substantially flat and parallel with respect to each other as clearly shown in FIG. 4. A plurality of circumferentially spaced theaded bores 24 are provided in the surface 20 concentrically arranged with respect to the bore 14 and a plurality of similar threaded bores 26 are circumferentially spaced on the surface 24 and concentrically arranged with respect to the bore 16, for a purpose as will be hereinafter set forth. The bores 14 and 16 are preferably of substantially equal diameters to provide a minimum of disturbance to the flow stream moving through the valve 10. A transversely extending recess or gate receiving chamber 28 is provided in the body substantially centrally disposed between the flat surfaces 20 and 22. The gate member 18 extends into the recess 28 and is reciprocal therein for a purpose and in a manner as will be hereinafter set forth.

The bore 14 is enlarged at 30 conterminous with the recess 28 to provide an annular shoulder 32 for receiving a valve seating member 34 thereagainst. The seat member 34 is of an annular configuration with the inner diameter thereof substantially equal to the diameter of the bores 14 and 16, and an O-ring or other suitable sealing member is disposed around the outer periphery of the seat 34 for precluding leakage of fluid therearound. The bore 16 is similarly enlarged at 38 to provide an annular shoulder 40 for receiving a valve seat member 42 thereagainst. The valve seat 42 is substantially identical to the seat 34 and a suitable sealing member or O-ring 44 is disposed around the outer periphery thereof for precluding leakage of fluid therearound.

The seat members 34 and 42 are disposed on opposite sides of the gate member 18 and are in constant engagement therewith whereby the gate member 18 facilitates retaining of the valve seats 34 and 42 in position against the shoulders 32 and 40, respectively. The body 12 is further provided with a transversely extending recess or gate receiving chamber 46 disposed in substantial alignment with the recess 28 and extending in an opposite direction with respect thereto. The gate member 18 extends into the recess 46 and is reciprocal therein. A sleeve member 48 having an internally threaded portion 50 is secured to the gate member 18 in any suitable manner and extends through the recess 46 and therebeyond into connection with a threaded shank 52. The shank 52 is secured to a suitable hand wheel 54 in a manner as will be hereinafter set forth whereby rotation of the hand wheel 54 transmits rotation to the shank 52. The shank 52 is held against longitudinal movement in a manner as will be hereinafter set forth whereby rotation of the shank 52 transmits reciprocal movement to the sleeve 48 for reciprocation of the gate member 18 in the gate receiving recesses 28 and 46.

A housing or sleeve member 56 is disposed around the shank 52 and sleeve 48 and is provided with an outwardly extending circumferential flange 58 at one end thereof disposed adjacent the upper end of the body 12 as viewed in FIG. 4. The flange 58 is bolted or otherwise removably secured to the body 12 in any suitable manner, such as by a plurality of spaced bolts 60, as is well known. The opposite end of the sleeve 56 is provided with a similar outwardly extending circumferential flange 62 for receiving a cover plate 64 thereon. The plate 64 is removably secured to the flange 62 in any suitable manner, such as by a plurality of bolts 66. Of course, suitable sealing means, such as an O-ring 68 is preferably interposed between the body 12 and the flange 58 for precluding leakage of fluid therebetween, and a similar sealing member or O-ring 70 is interposed between the flange 62 and the plate 64 for precluding leakage of fluid therebetween.

The plate 64 is provided with a central bore 72 for receiving the shank 52 therethrough. The bore 72 is enlarged at 74, providing an annular shoulder 75, and an annular retainer ring 76 is disposed in the enlarged bore portion 74 resting on the upper end of the flange 62 as particularly shown in FIG. 4. An outwardly extending circumferential flange 78 is provided on the outer periphery of the shank 52 and is disposed in the enlarged bore portion 74 between the washer or plate 76 and annular shoulder 75. It will be readily apparent that the shoulder 75 and washer 76 cooperate with the flange 78 for precluding longitudinal movement of the shank 52 upon rotation thereof by the hand wheel 54. Thus, rotation of the threaded shank 52 transmits reciprocal movement to the sleeve 48 by the threaded connection therewith at 50.

As hereinbefore set forth, the body 12 is provided with oppositely disposed substantially flat parallel surfaces 20 and 22. A pair of substantially identical flanged fitting members 80 and 82 of any usual or standard type having a plurality of circumferentially spaced bolt holes or bores 84 and 86, respectively, may be secured to the faces 20 and 22, respectively, by a plurality of bolts 88 and 90. The bores 84 are aligned with the bores 24 for receiving the bolts 88 therethrough in order that the flanged fitting 80 may be secured to the body 12 in the proximity of the face 20. The bores 86 are similarly aligned with the bores 26 for receiving the bolts 90 therethrough in order that the flanged fitting 82 may be secured to the body 12 in the proximity of the face 22.

The usual standard flanged fitting such as the fittings 80 and 82 shown herein are normally provided with an axially projection flat surfaced boss as shown at 92 for disposition adjacent a flat gasket 94, which in turn is disposed against the respective flat face of the body 12. The flange fittings 80 and 82 may be tightened against the respective gaskets 94 for precluding leakage of fluid between the body 12 and the flange fittings, as is well known.

Figure 1:
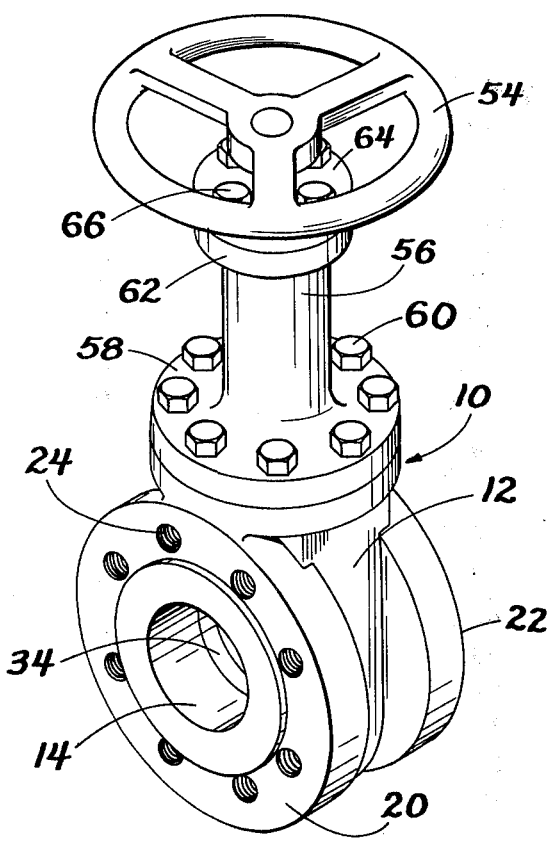
FIG. 1 is a perspective view of a wafer gate valve embodying the invention.
Figure 2:
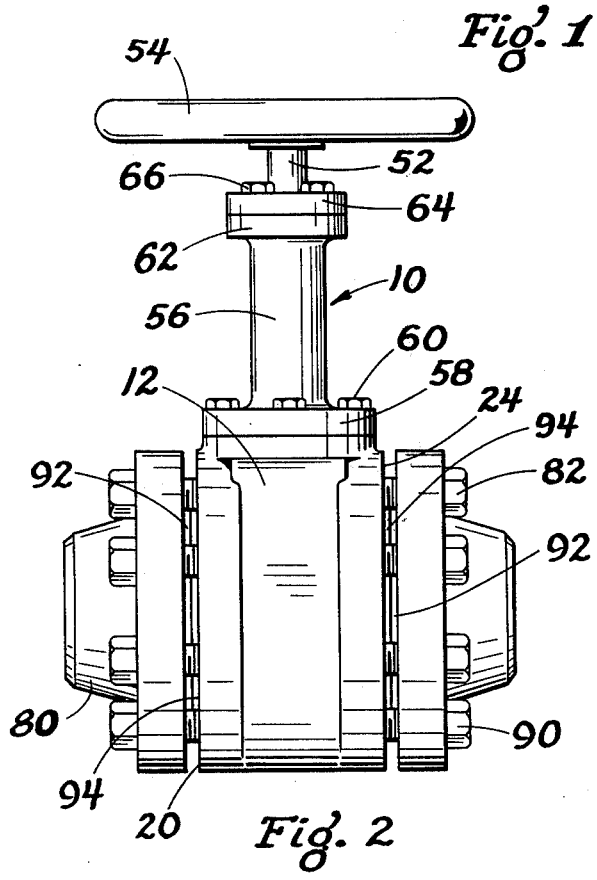
FIG. 2 is a side elevational view of a wafer gate valve embodying the invention and interposed between a pair of standard raised face flanges utilizing flat sealing gaskets.
Figure 3:
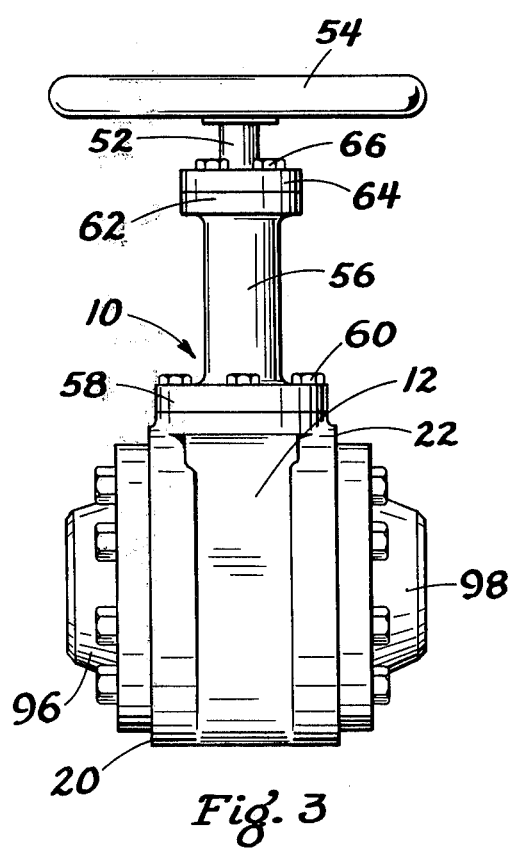
FIG. 3 is a view similar to FIG. 2 and depicting the valve interposed between a pair of special flanges utilized with o-ring sealing gaskets.

In the event a still further reduction in overall length for the valve 10 is required, specially designed flanged fittings as shown at 96 and 98 in FIG. 3 may be utilized in lieu of the fittings 80 and 82. The fittings 96 and 98 are generally similar to the flanges 80 and 82, with the exception that the longitudinal dimension thereof is less than the longitudinal dimension of the usual or normal standard flanged fitting. In addition, an annular groove (not shown) may be provided on each surface 20 and 22 concentrically arranged with respect to the bores 14 and 16 for receiving suitable O-ring sealing members (not shown) therein. The O-rings are in engagement with the inwardly directed flat surfaced bosses of the flanges 96 and 98 for precluding leakage of fluid between the body 12 and the respective flanges, and require less longitudinal space that the flat gaskets 94 as hereinbefore set forth.

Whereas the gate member 18 may be of any suitable construction wherein the gate member is of a slab-type configuration, the gate member 18 disclosed herein comprises a substantially slapshaped body 100 constructed of a ceramic material having characteristics of high-compressive strength, great hardness, and high resistance to corrosion, erosion and temperature extremes, such as Alumina Ceramic ($Al_2O_3$) and is generally similar to that disclosed in the John R. Fitzpatrick Pat. No. 3,614,061, issued Oct. 19, 1971, and entitled "Ceramic Gate Valve". A bore 102 is provided in the upper portion of the body 100 as viewed in FIG. 4, and the diameter of the bore 102 is substantially equal to the diameter of the bores 14 and 16 and the inner diameter of the valve seats 34 and 42. Thus, when the bore 102 is positioned in alignment with the bores 14 and 16 as shown in FIG. 4, the valve 10 will be in a full open position with substantially no obstruction of the flow of fluid, pipeline pigs (not shown) or the like, moving through the flow line (not shown) and valve.

When the gate body 100 is constructed from ceramic material, it is preferable that the valve seat members 34 and 42 be constructed of a similar ceramic material, thus reducing corrosion or erosion damage to the interior of the valve 10. In addition, the seat members 34 and 42 are engaged by the gate body 100 at all times, thus providing a ceramic to ceramic engagement for providing an optimum friction therebetween to greatly facilitate the up and down movement of the gate member 18 with respect to the seat members.

A substantially U-shaped pressure band 104 extends around the outer periphery and sides of the body 100, similar to that shown in the aforementioned Figzpatrick patent, and is maintained in tight engagement around the body 100, thus keeping the ceramic material from which the body 100 is constructed in constant compression.

The flanges 80 and 82 may be welded or otherwise interposed in the flow line (not shown), and the valve 10 may be inserted therebetween and bolted thereto as hereinbefore set forth to secure the valve in the flow line. When the valve 10 is interposed in the flow line (not shown) the gate member 18 may be moved upwardly and downwardly, as viewed in the drawings, by rotation of the shank 52 through the manual rotation of the wheel 54 for alternate opening and closing of the valve. When the shaft 52 is rotated in one direction, the gate moves downwardly, as viewed in the drawings, to the position shown in FIG. 4. The bore 102 will then be positioned in alignment with the bores 14 and 16 to provide a full open position for the valve. As hereinbefore set forth, the ceramic body 100 is maintained in compression at all times by the pressure band 104, thus assuring great strength for the gate member. In the event the gate body 100 is constructed from some other material, such as a suitable metal, the pressure band may not be necessary.

When it is desired to close the valve 10, the shaft 52 may be rotated in an opposite direction whereby the gate member 18 is moved upwardly with respect to the shank 52 and into the recess 46. The upward movement of the gate 18 will be limited either by the engagement of the sleeve 48 with the plate 76 or the engagement of the uppermost portion of the gate member 18 with the sleeve 56. In this uppermost position for the gate 18, the bore 102 will be moved completely away from the bores 14 and 16, and the bores 14 and 16 will be blocked by the body 100.

The bore or port 102 of the gate member 18 is disposed in the upper portion of the body 100 in order that the forces to open the valve are applied to the body 100 by a pushing or compressive stress, which is applied through the shaft 52 and sleeve 48. Of course, when the valve is opened the force on the body 100 through the band 104 will still retain compressive forces on the body 100.

ALTERNATIVE EMBODIMENT

Figure 5:
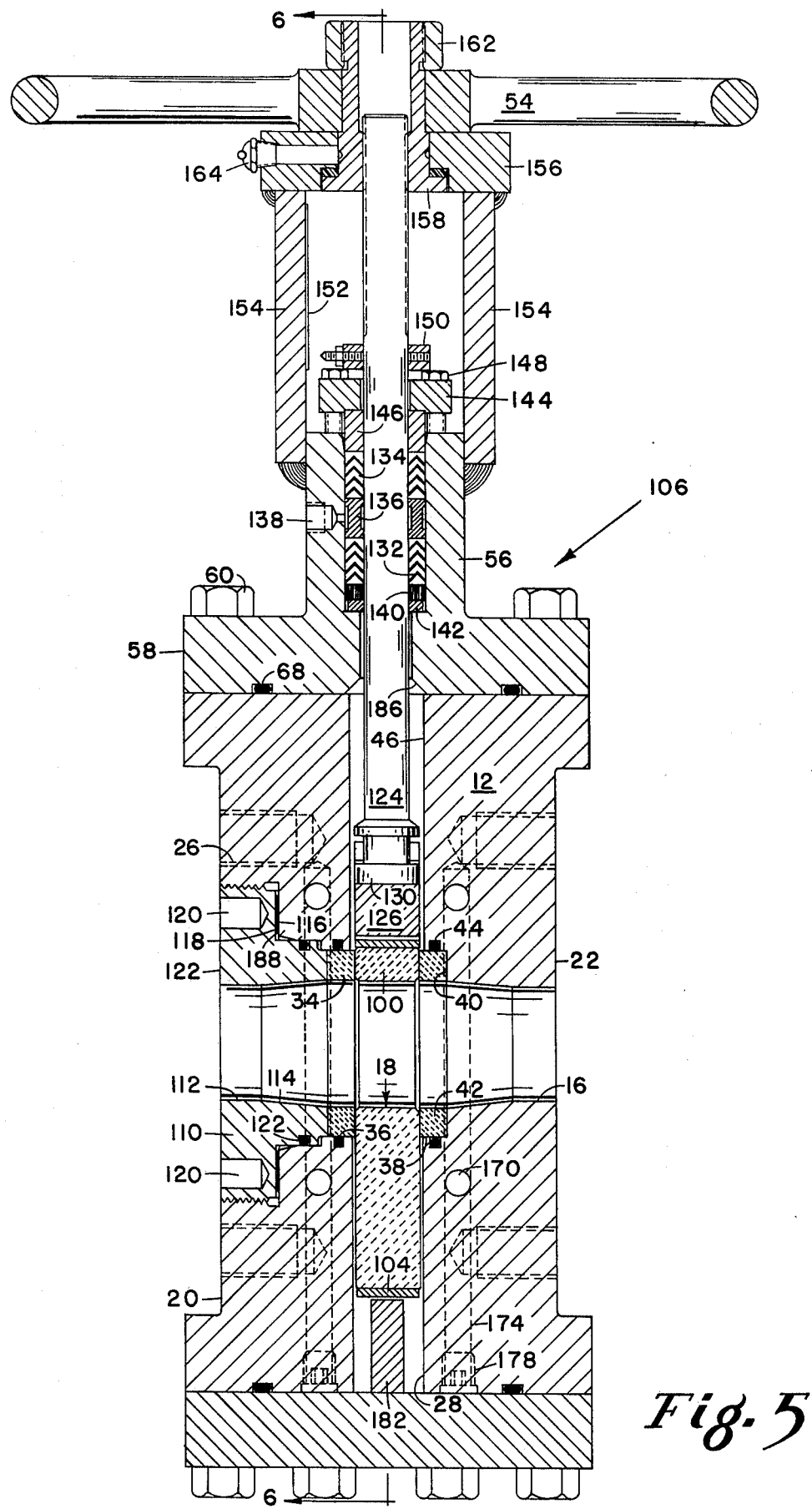
FIG. 5 is an enlarged sectional elevational view of an alternative embodiment of a wafer gate valve embodying the invention.
Figure 6:
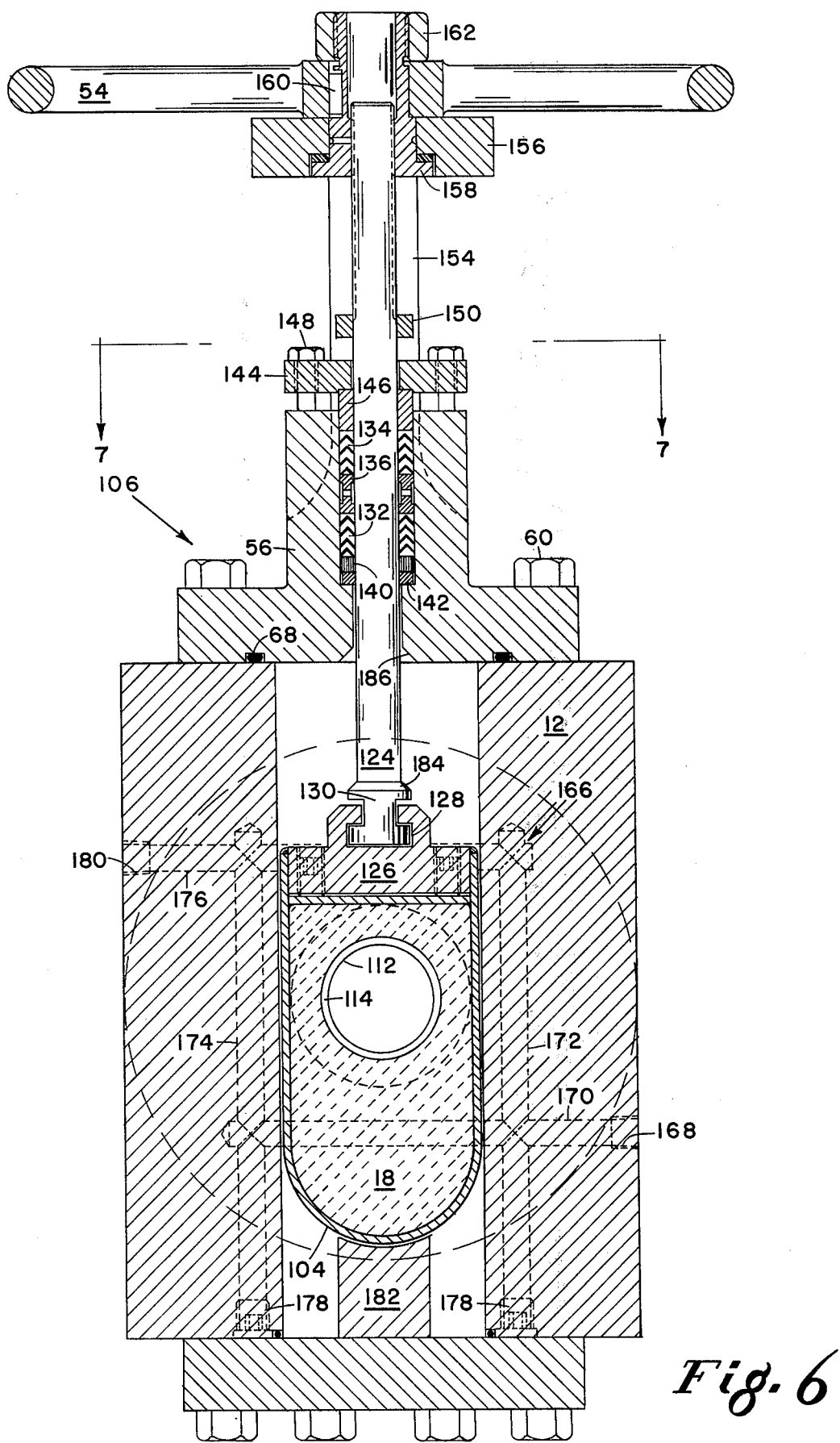
FIG. 6 is a cross-sectional view of FIG. 5 taken along section lines 6—6.
Figure 7:
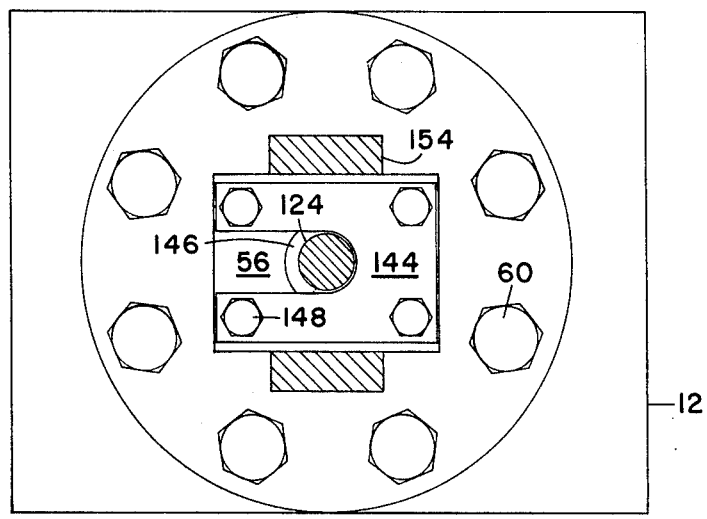
FIG. 7 is a sectional view of FIG. 6 taken along section lines 7—7.

Referring now to FIGS. 5, 6 and 7 in combination there is shown an alternative embodiment of the present invention. Like numerals will be used for the alternative embodiment where appropriate.

In the alternative embodiment there is shown a wafer gate valve represented generally by the reference numeral 106 and having a valve body 12. In valve body 12, bore 16 has a tapered portion to enlarge the bore before forming shoulder 40. Again seat member 42 is contained in the enlarged portion 38 and is sealed by a suitable O-ring 44.

While the previously described preferred embodiment has fewer components in the manufacturing, there is a problem of assembling the seat member 34 and 42 into the valve body 12 through the gate receiving recess 46. There is also a problem of positioning slab-like gate body between seat members 34 and 42, to obtain a proper sliding seal. In the alternative embodiment, seat member 34 is positioned and held in place by a threaded assembly block 110 having a bore 112 therethrough. Bore 112 also has a tapered portion 114 to enlarge bore 112 as shown in the drawing. The valve body 12 has a series of steps 116 that mate steps 118 of threaded assembly block 110.

During assembly seat member 42 is placed into position with its O-ring 44 and slab-like gate body 100 is inserted thereagainst. Next, seat member 34 and O-ring seal 36 are placed into position. Afterwards, threaded assembly block 110 is screwed into valve body 12 by means of pins inserted in holes 120. O-ring seal 122 prevents any fluid flowing through the wafer gate valve 106 from leaking between valve body 12 and assembly block 110. Assembly block 110 is machined so that its outer surface 122 is substantially flush with surface 20 of valve body 12. It may be necessary to insert shims 188 between steps 116 and 118 of valve body 12 and assembly block 110, respectively, to insure a proper sliding seal between slab-like gate body 100 and seat members 34 and 42.

In this alternative embodiment the slab-like member 100 is attached to a shaft 124 by means of a weld connection of pressure band 104 to following block 126. The upper portion of following block 126 has an inwardly flared notch 128 cut therein for receiving a mating notched portion 130 of shaft 124. The upper portion of shaft 124 extends through sleeve member 56 with two sets of chevron seals 132 and 134 located therebetween. Between the two sets of chevron seals 132 and 134 is located a lantern ring 136 which connects to tattletale hole 138 for detecting a leak in chevron seal 132. Below chevron seal 132 is located a graphite ring 140 and metal retaining ring 142. A cap 144 (better depicted in FIG. 7) is tightened against retaining ring 146 by bolts 148. This holds the chevron seals 132 and 134 in their respective positions for a good seal.

An indicator 150 is also attached to the shaft 124 for indicating the position of the slab-like gate body 100 on indicator plate 152.

Attached to opposing sides of sleeve 56 by any convenient means such as welding are upwardly extending plates 154 that are welded to top 156. Inside of top 156 is a flanged sleeve 158 that is threadably connected to the top of shaft 124 by means of raised threads. A turning wheel 54 is connected to sleeve 158 by means of key 160 with the cap nut 162 holding the wheel 54 in position. By turning wheel 54, sleeve 158 will turn thereby raising or lowering shaft 124 and the attached slab-like gate body 100. A grease fitting 164 provides lubrication between sleeve 158 and top 156.

When operating the wheel 54 to raise and lower the shaft 124 and attached slab-like gate body 100, a stop 182 abuts the bottom of band 104 to position the gate member 18 in its full open position. When the gate member 18 is raised until shoulder 184 comes to rest against undercut 186 of flange 58, flow through the wafer gate valve 106 has been stopped by the sealing of the lower solid portion of gate member 18 against seat members 34 and 42.

Inside of the valve body 12, but not in communication with the main flow lines, are contained passages which are represented generally by reference numeral 166 and shown in dotted lines in FIGS. 5 and 6. Since flow passages 166 are located on each side of slab-like gate body 100, only one portion of the flow passages will be described with it being understood that the flow passages on the other side of slab-like gate body 100 are identical. An inlet port 168 allows a heated fluid such as steam to flow into horizontal passage 170 which further connects to vertical passages 172 and 174. Vertical passages 172 and 174 are drilled from the bottom of the valve body 12 with the openings into the vertical passage being stopped by means of plugs 178 as shown in FIG. 5 and FIG. 6. The vertical passages 172 and 174 intersect an upper horizontal passage 176 which connects to outlet 180.

When a substance flowing through the wafer gate valve 106 must be maintained at a particular temperature to insure proper operation of the valve and flow of the substance, a heated fluid such as steam may flow through the flow passages 166 to heat the wafer gate valve 106.

From the foregoing it will be apparent that the present invention provide a novel gate valve having the body thereof particularly designed and constructed of a slim or relatively short overall length, thus permitting installation of the valve in a relatively small longitudinal space in a flow line. The novel gate valve is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A gate valve comprising a housing having aligned bores providing a fluid passageway therethrough, a gate member reciprocally interposed between the aligned bores to provide alternate open and closed positions for the valve, valve seat means disposed in the aligned bores and on opposite sides of the gate member for engagement thereby, means extending into the housing and operably connected with the gate member for reciprocating thereof, said gate member being provided with a transverse aperture in alignment with the aligned bores in one position of the gate to provide said open position for the valve and out of alignment with the aligned bores in a second position of the gate member to provide said closed position for the valve, said gate member comprising a slab-like body, said housing being of a slim overall length and having oppositely disposed substantially parallel flat faces for facilitating installation of the valve in a minimum longitudinal space, one of said flat parallel faces having a removable block means therein whereby said valve seat means may be assembled in said valve about said gate member, said block means being stepped for securing said valve seats against said gate member and simultaneous forming a part of one of said parallel flat faces, said block means sealing with said valve, shim means being used between said block means and said valve to insure a good seal between said gate means and said valve seat means.

2. A gate valve comprising a housing having aligned bores providing a fluid passageway therethrough, a gate member reciprocally interposed between the aligned bores to provide alternate open and closed positions for the valve, valve seat means disposed in the aligned bores and an opposite sides of the gate member for engagement thereby, means extending into the housing and operably connected with the gate member for reciprocating thereof, said gate member being provided with a transverse aperture in alignment with the aligned bores in one position of the gate to provide said open position for the valve and out of alignment with the aligned bores in a second position of the gate member to provide said closed position for the valve, said gate member comprising a slab-like body, said housing being of a slim overall length and having oppositely disposed substantially parallel flat faces for facilitating installation of the valve in a minimum longitudinal space, one of said flat parallel faces having a removable block means therein whereby said valve seat means may be assembled in said valve about said gate member, said block means being stepped for securing said valve seats against said gate member and simultaneous forming a part of one of said parallel flat faces, passages being through said valve on each substantially flat side of said slab-like body of said gate member, said passages having an entrance and exit for permitting the flowing of an auxiliary fluid through the body of the valve to maintain a given termperature range for proper flow of a main fluid through the gate member.

3. The gate valve as recited in claim 2 wherein said passages further include horizontal passages with connecting vertical passages on each side of said flat side of said gate member.

* * * * *

UNITED STATES PATENT OFFICE
CERTIFICATE OF CORRECTION

Patent No. 4,033,550          Dated July 5, 1977

Inventor(s) Charles Wheatley et al.

It is certified that error appears in the above-identified patent and that said Letters Patent are hereby corrected as shown below:

Column 1, line 37, "and or" should read -- and/or --.

Column 2, line 7, the number "18" should read -- 12 --.

Column 2, line 13, the number "24" should read -- 22 --.

Column 2, line 65, after the word "adjacent" the word -- to -- should be inserted.

Column 3, line 49, after "gaskets" -- 20 and -- should be inserted.

Column 3, line 68, after "gaskets" -- 20 and -- should be inserted.

Column 4, line 4, "slapshaped" should read -- slabshaped --.

Column 5, line 27, after "positioning" -- the -- should be inserted.

Column 6, line 48, "provide" should read -- provides --.

Column 7, line 26, "an" should read -- on --.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*